(12) United States Patent
Richardson et al.

(10) Patent No.: US 7,162,880 B2
(45) Date of Patent: Jan. 16, 2007

(54) COOLING APPARATUS, SYSTEMS AND METHODS

(75) Inventors: Roy Richardson, Newark, DE (US); John Achzet, Elkton, MD (US); Robert Dickinson, Townsend, DE (US); Alan McFoy, Wilmington, DE (US)

(73) Assignee: Royal Fumigation, Inc., Newark, DE (US)

( * ) Notice: Subject to any disclaimer, the term of this patent is extended or adjusted under 35 U.S.C. 154(b) by 57 days.

(21) Appl. No.: 10/657,958

(22) Filed: Sep. 8, 2003

(65) Prior Publication Data

US 2004/0107707 A1    Jun. 10, 2004

(51) Int. Cl.
*F25D 25/00*    (2006.01)

(52) U.S. Cl. .......................................................... 62/62

(58) Field of Classification Search ................... 62/62, 62/64, 89, 104, 180, 314, 414, 419; 43/125
See application file for complete search history.

(56) References Cited

U.S. PATENT DOCUMENTS

| | | | |
|---|---|---|---|
| 1,518,434 A | | 12/1924 | Klein |
| 2,080,103 A | * | 5/1937 | Zarstschenzeff ............... 62/63 |
| 3,604,217 A | * | 9/1971 | Spear .......................... 62/268 |
| 3,844,132 A | * | 10/1974 | Miller et al. ................... 62/268 |
| 3,869,605 A | * | 3/1975 | Davis .......................... 362/264 |
| 4,033,367 A | | 7/1977 | Johnston ......................... 135/8 |
| 4,061,483 A | * | 12/1977 | Burg ............................ 62/268 |
| 4,141,224 A | * | 2/1979 | Alger et al. .................. 62/50.1 |
| 4,407,140 A | * | 10/1983 | Kobayashi .................... 62/268 |
| 4,485,633 A | * | 12/1984 | King et al. ................... 62/180 |
| 4,576,014 A | | 3/1986 | Miller et al. ................... 62/268 |
| 4,776,181 A | * | 10/1988 | Maule ........................ 62/323.1 |
| 5,277,031 A | | 1/1994 | Miller et al. ................... 62/100 |
| 5,386,703 A | * | 2/1995 | Later ........................... 62/268 |
| 5,638,695 A | * | 6/1997 | Kamio et al. ................. 62/279 |
| 5,641,463 A | | 6/1997 | Langhart .................... 422/294 |
| 5,647,612 A | * | 7/1997 | Yoshida et al. ................. 285/13 |
| 5,904,909 A | | 5/1999 | Yates et al. ................. 423/240 |
| 5,964,065 A | * | 10/1999 | Migurski et al. ............... 52/64 |
| 5,992,169 A | * | 11/1999 | Later ........................... 62/270 |
| 6,047,496 A | | 4/2000 | Leitner et al. ................ 43/125 |

(Continued)

FOREIGN PATENT DOCUMENTS

JP      5-252855 A    * 10/1993

(Continued)

*Primary Examiner*—Mohammad M. Ali
(74) *Attorney, Agent, or Firm*—Schnader Harrison Segal & Lewis, LLP

(57) ABSTRACT

The present invention is directed toward a method, apparatus and system for cooling goods, such as, for example, agricultural products, in a substantially sealed chamber. A method of the invention includes placing goods on a surface; forming a chamber over the goods on the surface; positioning a cooling apparatus having a first portion and a second portion proximate to the goods; enclosing the first portion of the cooling apparatus in the chamber; substantially sealing the chamber; and cooling the goods. A cooling system of the invention comprises a first support having a carrier; an evaporation coil mounted to the first support; a second support having a carrier; a compressor mounted to the second support, the compressor coupled to the evaporation coil; and a substantially sealed enclosure positioned over the evaporation coil and such that the compressor is positioned without the chamber.

20 Claims, 6 Drawing Sheets

U.S. PATENT DOCUMENTS

| | | | |
|---|---|---|---|
| 6,422,253 B1 | 7/2002 | Glynn et al. | 135/115 |
| 6,450,188 B1 | 9/2002 | Langhart | 135/115 |
| 6,513,282 B1 * | 2/2003 | Schott et al. | 43/129 |
| 6,644,043 B1 * | 11/2003 | Later | 62/64 |
| 6,662,587 B1 * | 12/2003 | Rembold et al. | 62/292 |
| 2001/0029695 A1 | 10/2001 | Schott et al. | 43/129 |

FOREIGN PATENT DOCUMENTS

| | | |
|---|---|---|
| JP | 2002-48356 A * | 2/2002 |
| WO | WO 00/62607 | 10/2000 |

* cited by examiner

COOLING APPARATUS, SYSTEMS AND METHODS

FIELD OF THE INVENTION

The invention relates generally to cooling, and includes a process, conducted in a substantially sealed chamber, to establish a cooling trend in goods, particularly useful after fumigation or other treatment.

BACKGROUND OF THE INVENTION

A variety of goods transported throughout the world needs to be cooled from time to time before, during and/or after shipment to maintain their condition, which may be adversely affected by exposure to certain environmental conditions. For example, it is known that fresh fruits and vegetables have a limited commercial life, as they mature, ripen and, in fact, decay in the journey from harvest to market. To maximize shelf life, fruits and other produce are normally transported and stored under refrigeration to slow the metabolic processes associated with ripening and decay. Maintaining a substantially constant optimum temperature of a perishable commodity from harvest to market is referred to as maintaining the product's "cold chain". A break in the cold chain from harvest to market can affect the condition and shelf life and, hence, the value of the commodity. Thus, it is desirable to maintain the cold chain from harvest to market.

Under certain circumstances, however, breaking the cold chain may be unavoidable and even necessary. For example, governmental quarantine regulations may require fumigation of a commodity that is being transported from one area to another to prevent the spread of pests that could pose a threat to the destination's agriculture. In circumstances such as these, fumigation may be conducted at a temperature above the optimum storage temperature for the commodity, thus resulting in a break in the cold chain. Fumigation of perishable agricultural products is most often accomplished using the pesticide methyl bromide. Methyl bromide must be in its gaseous state to be an effective fumigant and to cause the least damage to the commodity. Because its boiling point is 38.5 degrees F., however, government quarantine regulations require that the temperature of the commodity be at least 40 degrees F. for fumigation so that the methyl bromide does not liquefy. The optimum storage temperatures for many agricultural products, including most fruits, however, are at or near 32 degrees F., such that the eight degree increase in temperature required for fumigation affects a significant break in the cold chain. Accordingly, it is desirable to re-establish the cold chain as soon as possible after fumigation, as this can confer a significant benefit on the product.

Moreover, and again in the example of fumigation of fresh fruit, once the temperature of the commodity begins to increase, it typically does not stop at 40 degrees F. This is because once a warming trend is established in a large mass of fruit, it is difficult to halt quickly due to the mass, its being packed tightly together, and the metabolic processes that take place at temperatures above the optimum storage temperature. Returning the product to its optimum storage temperature involves not only stopping the warming trend, but also reversing it, and during these stages the cold chain remains broken. Traditionally this re-cooling has been accomplished simply by placing the product in a cold storage facility. Returning a product such as fresh fruit to it optimum storage temperature by this traditional means can take 24 to 72 hours if the fruit is packaged in wooden crates, and up to seven to ten days if it is packaged in cardboard containers, which are currently the packaging of choice.

In prior art systems and methods, fumigation is accomplished by sealing the commodity in a chamber formed by an enclosure, and filling the chamber with a fumigant at a sufficient concentration and temperature to obtain the desired results. When the commodity is fruit, for example, methyl bromide is circulated throughout the chamber for a period of time, typically several hours, to treat the fruit. Following the exposure period, the methyl bromide gas is evacuated from the chamber and the product is aerated for an additional period of several hours by fans that circulate fresh air. After that, the enclosure is removed and the product is left in place in still air so that methyl bromide absorbed or trapped by the packaging material can desorb. Finally the fruit can be put in a cold storage facility or refrigerated transport.

Once the fruit is in a cold storage facility, under prior art systems and methods, it takes from three to ten days or more to reduce the temperature of the fruit to its optimum storage temperature. This break in the cold chain substantially decreases the commercial value of the fruit by adversely affecting its condition. For example, for every day of delay in getting fresh fruit to market, it has been estimated that a case of highly perishable fruit can lose between 5 to 10% of its value. Currently, ships can deliver for fumigation as much as 700,000 cases of fruit at a time having a market value of approximately $7 million, and the trend is toward larger capacity ships. A 10% loss of value per day thus translates to a $700,000 loss per ship per day, in addition to the tangible expenses of rent for storage, added transportation costs, etc.

Accordingly, it would be helpful to the art to minimize the length of time during which the cold chain is broken. It would be further helpful to the art if a cooling method could be used to take a commodity to its optimum storage temperature after harvest by establishing the cold chain temperature rapidly in the first instance.

SUMMARY OF THE INVENTION

Embodiments of the present invention include apparatus, methods and systems for cooling. According to embodiments of the invention, goods are placed on a surface for cooling and/or treatment. A cooling apparatus having a first portion and a second portion is also placed on the surface, such that an enclosure may be positioned over the first portion of the cooling apparatus. The enclosure forms a chamber over the goods and the first portion of the cooling apparatus. The chamber is then sealed and the goods are cooled. In some embodiments, the goods may be fumigated in the sealed chamber prior to cooling. Also, prior to or during the cooling process, sensors may be positioned in the chamber to sense a condition, such as temperature, humidity, fluid concentration, etc. The cooling apparatus may react to the sensor information to affect the condition of the chamber. The sensor information may also be displayed to a system operator.

DETAILED DESCRIPTION OF THE PREFERRED EMBODIMENTS

The present invention will be understood more fully from the detailed description given below and from the accompanying drawings of preferred embodiments of the invention, which, however, should not be taken to limit the invention to a specific embodiment, but are for explanation and understanding only.

Embodiments of the present invention are used to cool agricultural products, such as fruit; although it should be understood that the invention includes apparatus, systems and methods for cooling any goods, such as foods, electronics, perishable items etc., in which it is desirable to control a condition, such as temperature and/or humidity.

Embodiments of the invention comprise an enclosure, such as a fumigation tent or tarp that forms a chamber over a surface after goods are placed on the surface for treatment. The enclosure may comprise permanent structures, such as storage facilities, and/or flexible, semi-solid and/or solid structures. Exemplary enclosures are described in applicant's U.S. patent application Ser. No. 09/871,774 entitled "Method and Apparatus for Treating Goods," and in U.S. Pat. No. 5,641,463 to Langhart entitled "Mechanized Tent", U.S. Pat. No. 6,422,253 to Glynn, et al. entitled "Mechanized Fumigation Tent with Composite Closing Structure", and U.S. Pat. No. 6,422,253 to Langhart entitled "Mechanized Fumigation Tent."

Figure 1A:
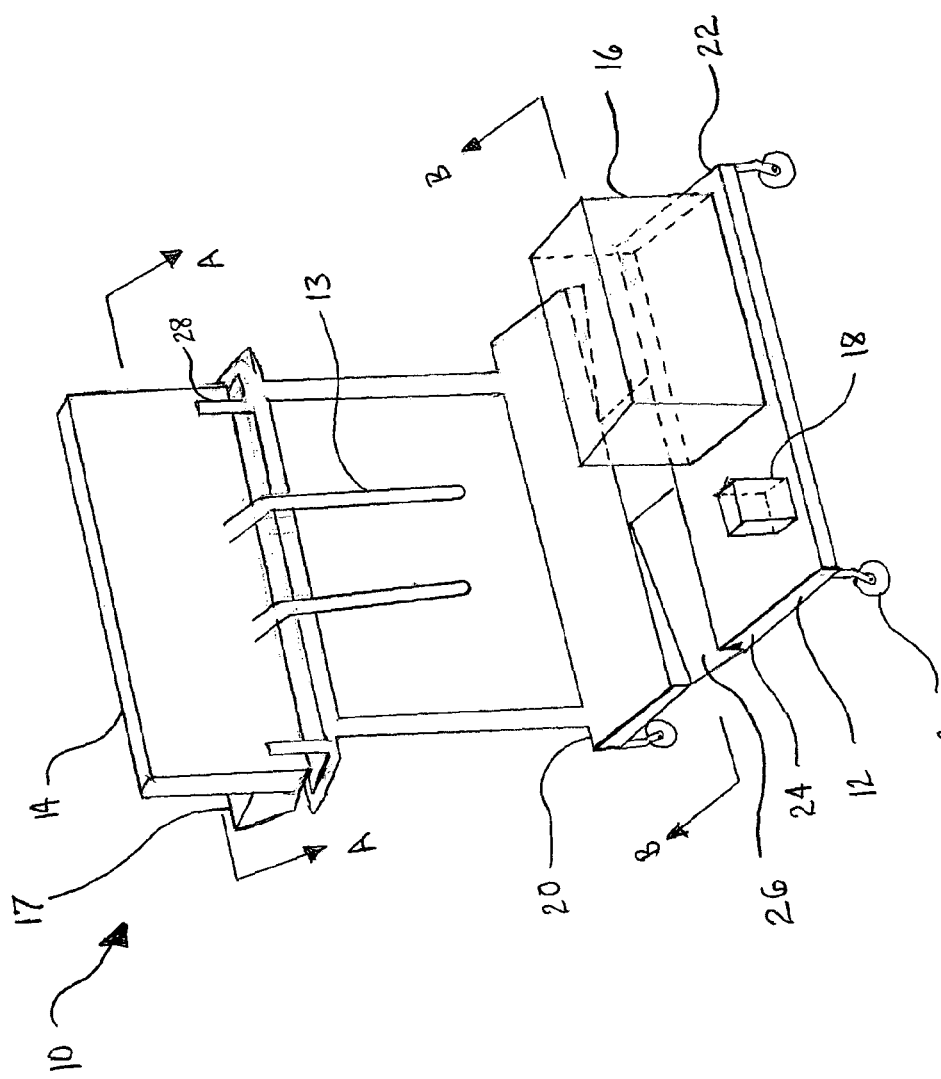
FIG. 1A is a perspective drawing of a preferred embodiment of a cooling apparatus of the present invention.
Figure 1B:
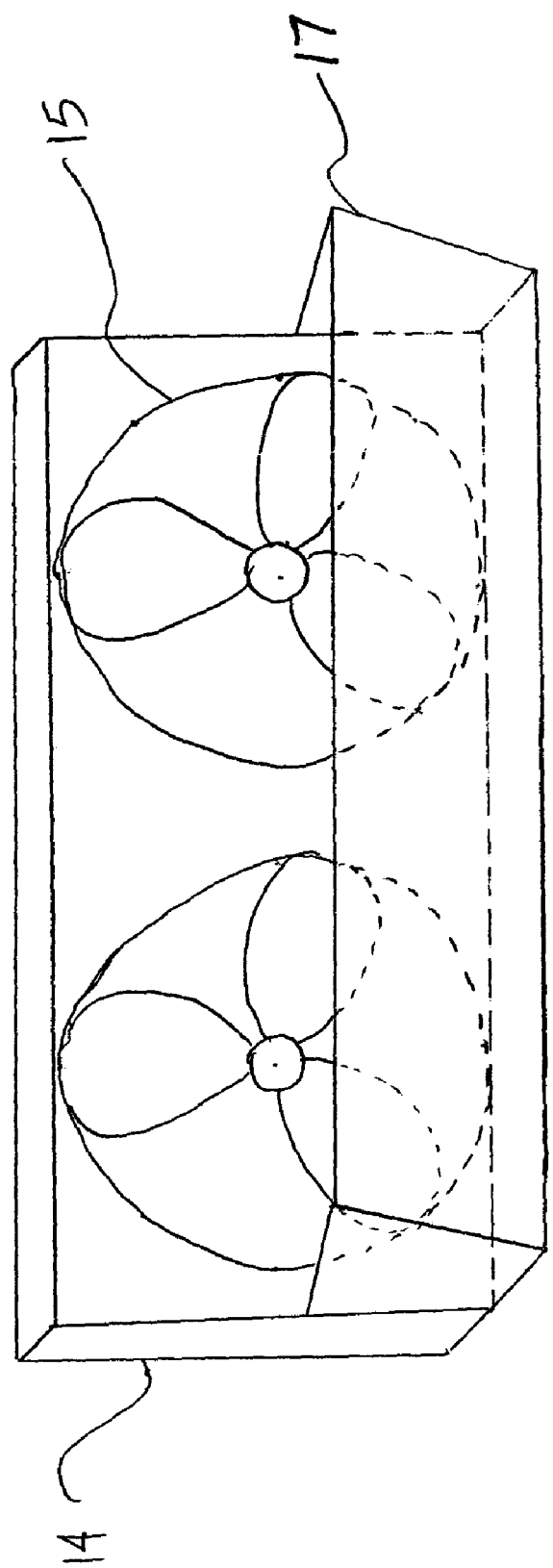
FIG. 1B is a partial view of the embodiment depicted in FIG. 1A along lines A—A showing circulation fans and a deflector.

Referring now to FIGS. 1A and 1B, there is shown an illustrative embodiment of a cooling apparatus 10 of the invention comprising a refrigeration system mounted on a frame 12. The definition of the term "mounted" as used herein includes affixed to or resting on. The refrigeration system comprises an evaporation coil 14, a compressor 16, and a refrigerant accumulator 18 operably connected in a well-known manner. In some embodiments of the invention, the compressor 16 is detachably coupled to the evaporation coil 14. The refrigeration system is arranged on the frame 12 such that the evaporation coil 14 may be situated within a chamber formed by an enclosure to cool goods located within the chamber. Circulation fans 15 placed adjacent to the evaporation coils 14 pull and/or push a flowable material, such as air or gas, through the coils in the chamber. A deflector 17 may be associated with the circulation fans 15. The deflector 17 may be fixed or removeably attached to the cooling apparatus 10. The deflector 17 may be attached, for example, to the circulation fans 15, the frame 12, the enclosure, and/or stand-alone. The deflector 17 moves the flowable material in the chamber in a desired direction, and preferably, over the goods on the surface, and therefore may have a variety of shapes to accomplish this function.

The cooling apparatus 10 may further comprise projections, such as struck up members 13, to prevent the enclosure from contacting the evaporation coils 14, particularly when the circulation fans 15 are operable. The projections may be placed adjacent to the evaporation coils 14, attached to the coils 14 and/or attached to the frame 12.

The frame 12 of cooling apparatus 10 may be unitary and, preferably comprises a first portion 20, a second portion 22, and an intermediate portion 24 with a channel 26. It should be understood that the invention is not limited to a unitary frame, as demonstrated for example by FIG. 4, and embodiments of a frame of the invention may comprise any number of separate and/or connected parts. The frame 12 may be formed from metal, plastic, and/or any composite material. The frame first portion 20, as shown in FIG. 1A, extends substantially vertically from the intermediate portion 24 and has a support 28 for mounting the evaporation coils 14. The frame 12 may be extended to include a plurality of evaporation coils based on a desired cooling capacity. The frame first portion 20 may be adjustable to raise and lower the height of the evaporation coil 14. The frame second portion 22 supports the compressor 16. Preferably, but not necessarily, the frame second portion 22 also supports the accumulator 18. The frame intermediate portion 24 connects the frame first portion 20 to the frame second portion 22.

Frames of the invention may be raised on one or more carriers to facilitate movement of a cooling apparatus, or a portion thereof. The exemplary carriers depicted in FIG. 1A are wheels 32. However, carriers contemplated by embodiments of the invention may comprise, for example, any number of casters, wheels, slides, bearings, or any other technique known or not yet known to reduce surface friction, or allow rolling of the apparatus, for ease of movement, including but not limited to external systems and/or devices acting on a cooling apparatus, or portion thereof In embodiments of the invention, the carriers may be retractable to raise and lower the frame from the surface. Retractable carriers may first facilitate movement of a cooling apparatus to a desired location, then, once in place, be retracted to set the apparatus on the surface.

Figure 2:
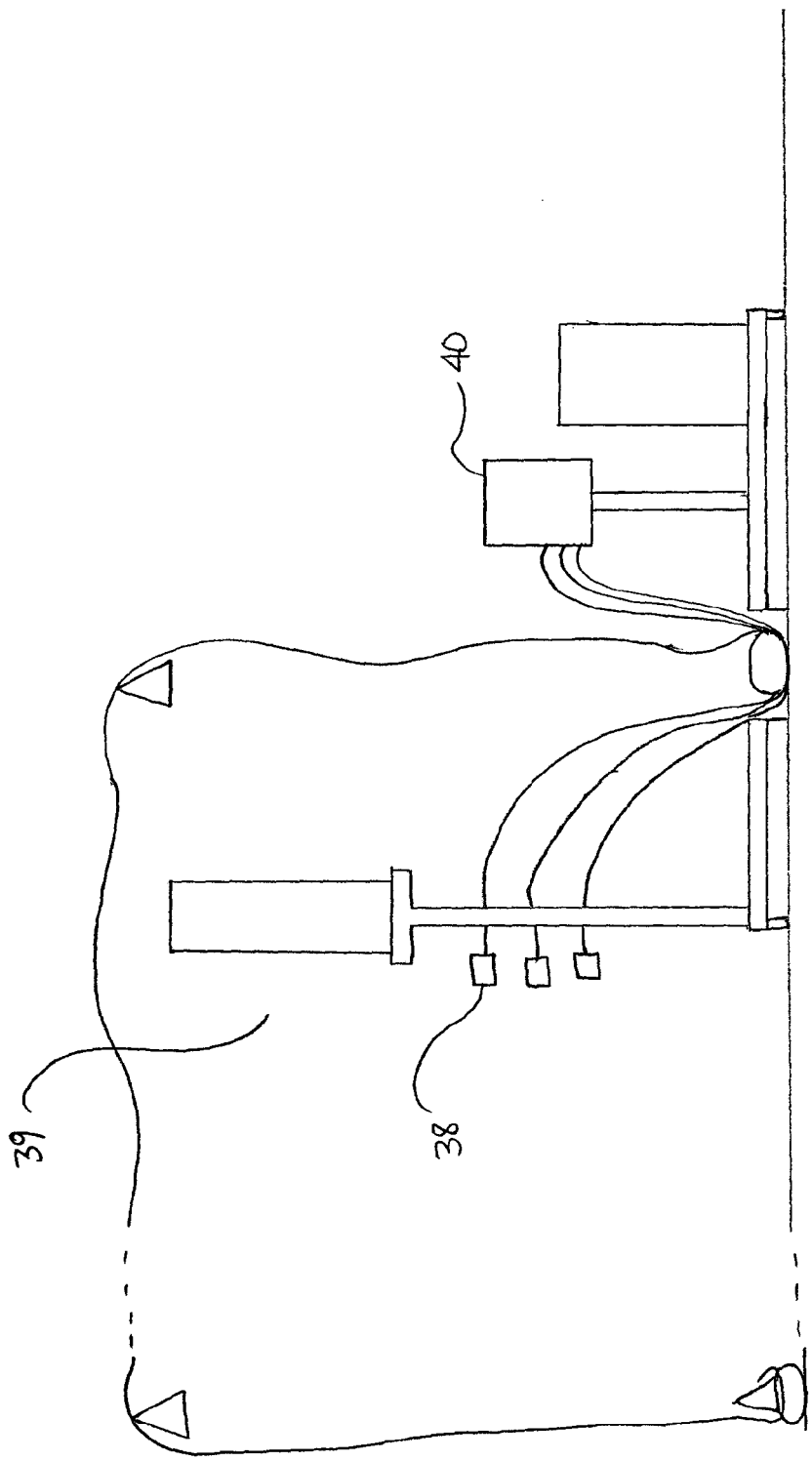
FIG. 2 shows sensors and a display box in accordance with embodiments of the invention.

An embodiment of the invention, depicted in FIG. 2, further comprises control circuitry to control power to the system and environment management. The control circuitry comprises sensors, such as, for example, thermocouples and/or other environmental sensing elements for detecting a condition, such as temperature, within the chamber 39. In at least one embodiment, sensors 38 are in the chamber and are in communication with a display box 40, outside the chamber. The sensors 38 relay information to the display box 40 to indicate a condition of the chamber and/or the goods being cooled. The condition may be, for example, temperature, humidity, fluid velocity, fluid concentration, etc. The operator of the cooling apparatus may read the display box 40 and affect the cooling process to reach and/or maintain a desired condition. Other embodiments of the invention compare a desired condition to the sensor information and automatically adjust the cooling process according to the comparison.

Figure 3A:
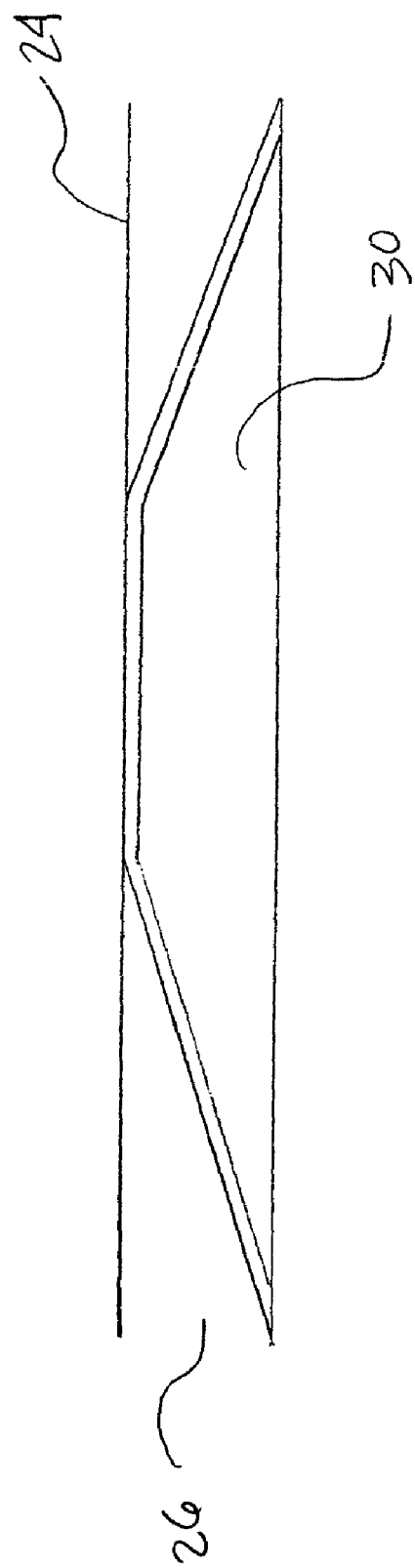
FIG. 3A is a sectional view of the embodiment depicted in FIG. 1 taken along lines B—B showing a channel and conduit of the cooling apparatus according to embodiments of the invention.

FIG. 3a is a sectional view of the embodiment of the invention depicted in FIG. 1A taken along line B—B showing the intermediate portion 24 and the channel 26 in greater detail. In a preferred embodiment, the intermediate portion 24 comprises a channel 26 onto which an enclosure may be placed. The channel 26 may be a flat surface and/or sloped, and may form a conduit 30 to facilitate a connection between the evaporation coil 14 and the compressor 16. The channel 26 may partially extend or fully extend over the length of the intermediate portion. In illustrative embodiments of the invention, the intermediate portion 24 and/or channel 26 may be raised and lowered from the surface.

Figure 3B:
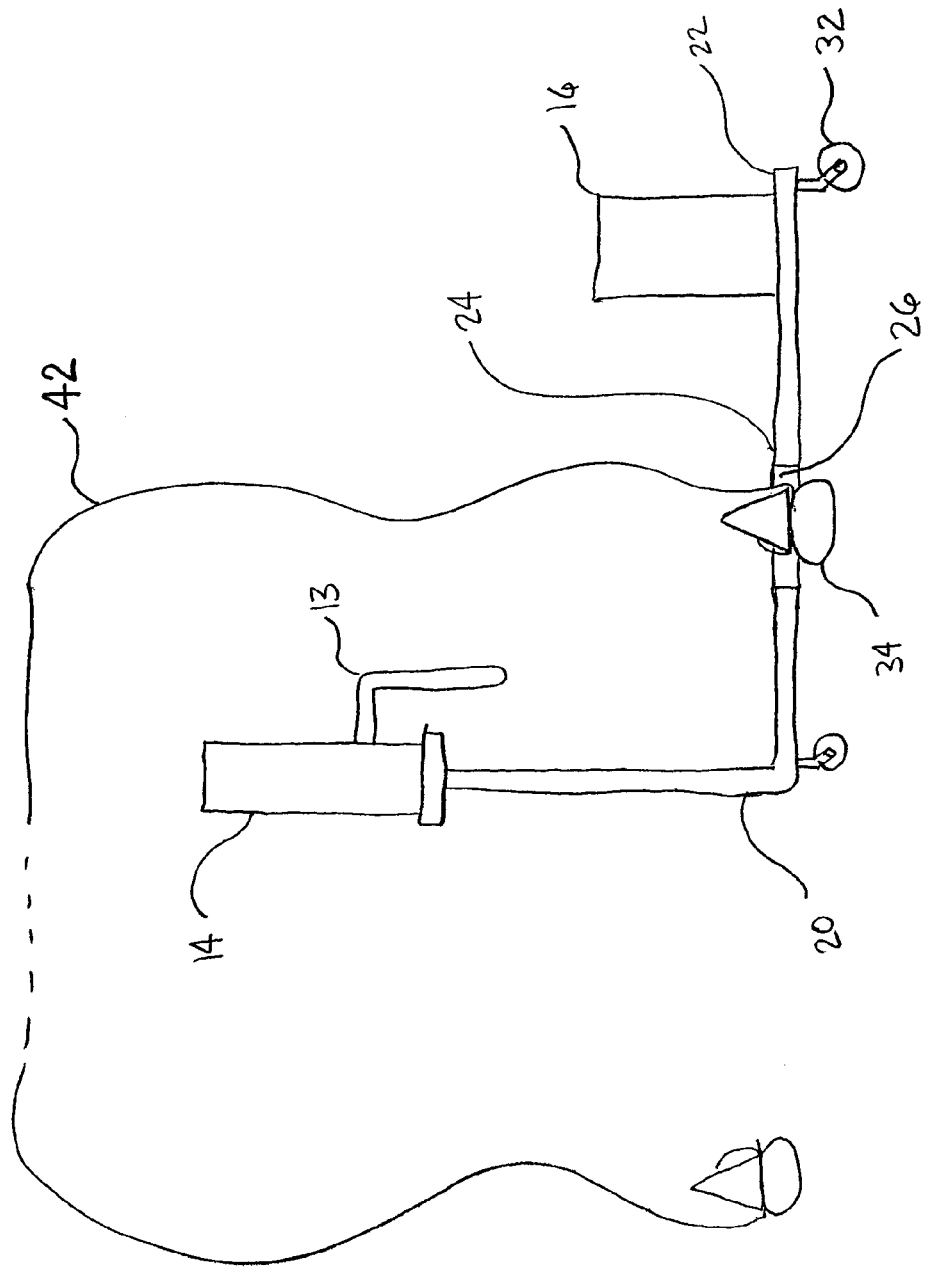
FIG. 3B is a side view of an embodiment of an apparatus according to the invention showing an enclosure positioned over the evaporation coils and sealed to the surface and the intermediate portion.

FIG. 3B is a side view of the embodiment of the invention depicted in FIG. 1A. As shown in FIG. 3B, an enclosure 42 may be placed on the channel 26 to form a chamber over the frame first portion 20 and the goods. In preferred embodiments, a seal 34 along the lower perimeter of the enclosure 42 may facilitate forming the chamber by deforming against the frame 12, such as along intermediate portion 24. The seal 34 is preferably comprised of, for example, a gasket, plastic tubing, a laminated casing filled with compressible material (such as closed cell foam, polystyrene or the like), plastic foam, a composite closing structure, a flexible and/or solid base holding a liquid, a flexible material, such as hollow or solid hosing, synthetic foam, rubber, or rubber foam, a solvent dispersed synthetic rubber resin adhesive, or one or more sand "snakes" (that is, vinyl sleeves filled with sand) or loose sand, but is not limited thereto. Preferably, the seal 34 substantially seals the chamber.

Figure 4:
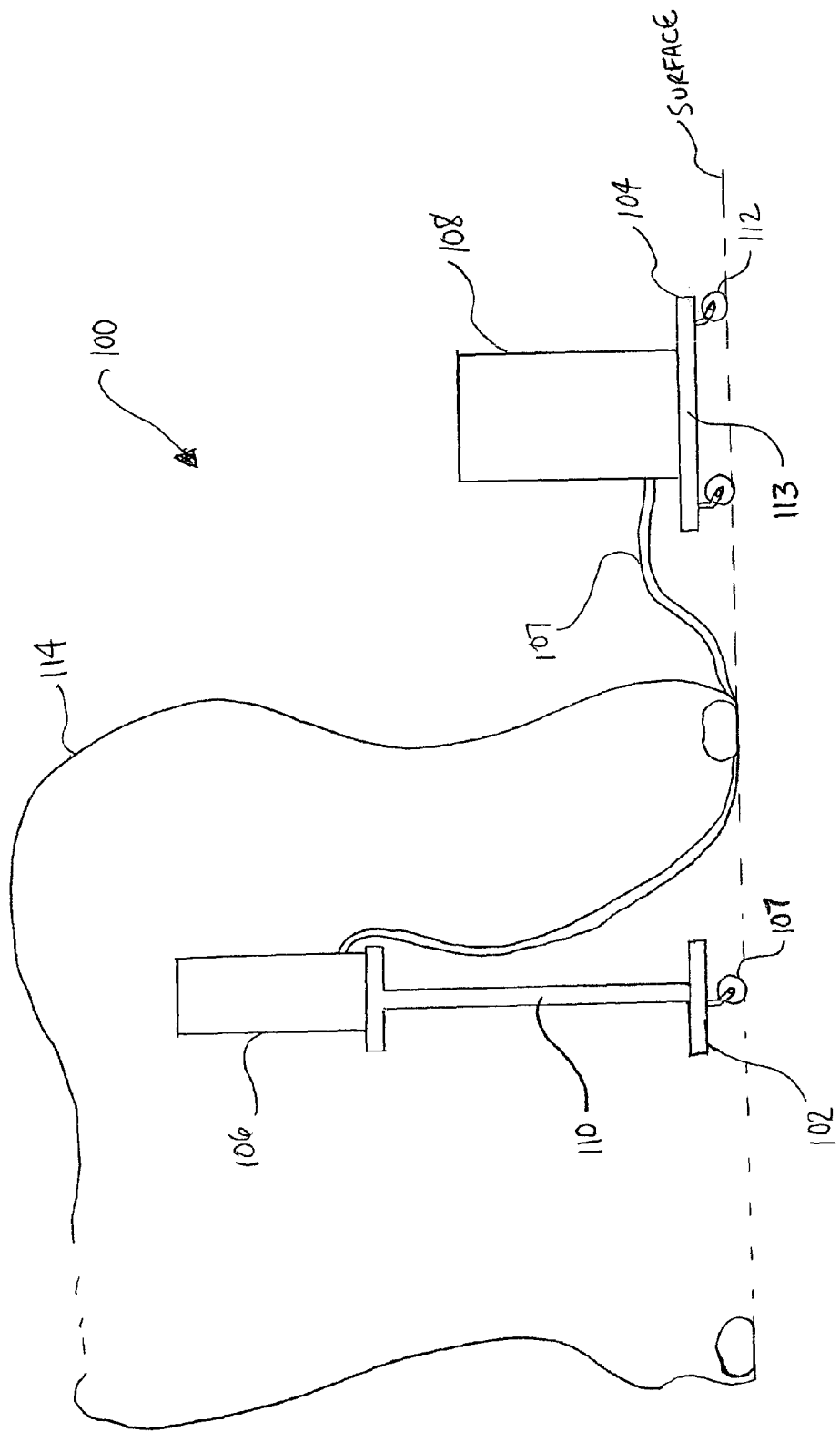
FIG. 4 is a side view of an alternative embodiment of a cooling apparatus according to the invention.

FIG. 4 shows an alternative embodiment of a cooling apparatus 100. The cooling apparatus 100 comprises a refrigeration system having a first portion 102 and a second portion 104. The first portion 102 comprises an evaporation coil 106, which may be mounted on carriers, such as wheels 107. Preferably, the first portion 102 comprises a frame 110 to elevate the evaporation coil 106, as shown in FIG. 4, and a carrier that is attached to the frame. The second portion 104 comprises a compressor 108, which also may be mounted on a carrier, such as wheels 112. Preferably, the second portion of the refrigeration system 104 comprises a frame 113, as shown in FIG. 4, and the carrier is attached to the frame. The evaporation coil 106 may be detachably coupled to the compressor 108 via a conduit 107.

Preferred embodiments of the invention further comprise an enclosure 114 over the first portion 102 of the refrigeration system. The enclosure forms a chamber over goods to be cooled and/or treated, as described above. The enclosure may be substantially sealed to the surface on which the goods are stored, to inhibit a flowable material in the chamber, such as air or gas, from escaping during treatment and/or cooling. The cooling apparatus 100 may further comprise sensors, circulations fans, deflectors, projections, control circuitry, etc. as described above in connection with other embodiments of the invention.

While the invention has been described by illustrative embodiments, additional advantages and modifications will occur to those skilled in the art. Therefore, the invention in its broader aspects is not limited to specific details shown and described herein. Modifications, for example, to type and number of carriers, sensors, circulation fans, shape or number of frame elements, projections, and/or deflectors, may be made without departing from the spirit and scope of the invention. Accordingly, it is intended that the invention not be limited to the specific illustrative embodiments, but be interpreted within the full spirit and scope of the appended claims and their equivalents.

We claim:

1. A method of cooling goods comprising the steps of:
    placing said goods on a surface;
    providing an apparatus adapted to form a chamber over said goods on the surface;
    positioning at least one cooling apparatus having a first portion and a second portion proximate the goods, providing at least one carrier on which the cooling apparatus rests to facilitate movement of the apparatus;
    lowering the apparatus adapted to form a chamber over said goods and over the first portion of the cooling apparatus causing a seal material located on a lower perimeter of said chamber apparatus to deform against the surface to substantially seal the chamber; and
    cooling the goods.

2. The method of claim 1 wherein the step of cooling said goods comprises the step of:
    sensing a first condition;
    setting a desired condition; and
    activating the cooling apparatus to affect the first condition in response to the desired condition.

3. The method of claim 2 wherein first condition is a chamber temperature and the desired condition is a desired chamber temperature.

4. The method of claim 2 wherein first condition is an inner temperature of the goods and the desired condition is a desired inner temperature of the goods.

5. The method of claim 1 wherein the first portion and the second portion of the cooling apparatus are connected via an intermediate portion of the cooling apparatus, and the step of substantially sealing the chamber further comprises the step of:
    causing the seal to deform against the intermediate portion to substantially seal the chamber.

6. The method of claim 1 further comprising the step of treating said goods after the step of substantially sealing the chamber.

7. The method of claim 6 wherein the step of treating comprises the step of fumigating the goods.

8. A cooling apparatus frame comprising:
    a frame first portion for mounting an evaporation coil;
    a frame second portion for mounting a compressor;
    a frame intermediate portion connecting the frame first portion to the frame second portion; said frame intermediate portion forming a conduit between the frame first portion and the frame second portion; the conduit providing access for a connection between the evaporation coil and the compressor; said frame intermediate portion adapted to receive a seal that is located substantially along a lower perimeter of an enclosure that forms a chamber over said frame first portion; and
    at least one carrier, wherein said frame rests on said at least one carrier to facilitate movement of the frame.

9. The cooling apparatus frame of claim 8 wherein the frame intermediate portion comprises a surface having a plurality of sloped portions and a substantially level portion adjacent to one of the plurality of sloped portions.

10. The cooling apparatus frame of claim 8, wherein the one or more carriers comprise at least one caster.

11. The cooling apparatus frame of claim 8 further comprising at least one projection adjacent to the evaporation coils to facilitate movement of a flowable material through the evaporation coils by inhibiting contact between the substantially sealed enclosure and the evaporation coil.

12. The cooling apparatus frame of claim 8 further comprising a circulation fan mounted to the frame first portion.

13. The cooling apparatus frame of claim 8 further comprising a deflector mounted to the frame first portion to direct the flowable material in a desired direction.

14. A cooling system comprising:
    a first support;
    an evaporation coil mounted to the first support;
    a second support;
    a compressor mounted to the second support, the compressor coupled to the evaporation coil;
    a substantially sealed enclosure formed by lowering an enclosure over the evaporation coil and over goods on a surface to be cooled causing a seal material located on a lower perimeter of said enclosure to deform against said surface and such that the compressor is positioned without the enclosure; and at least one carrier, wherein at least one of said first support and said second support rests upon said carrier to facilitate movement of at least one of said first support and said second support.

15. The cooling system of claim 14 further comprising an intermediate support connected to the evaporation coil support and the compressor support, the intermediate support having a beveled surface to facilitate substantially sealing the enclosure.

16. The cooling system of claim 15 wherein the beveled surface forms a conduit to facilitate the coupling of the evaporation coil and the compressor.

17. The cooling system of claim 14 wherein the compressor is detachably coupled to the evaporation coil.

18. The cooling system of claim 14 further comprising a projection associated with the evaporation coil to inhibit contact between the substantially sealed enclosure and the evaporation coil.

19. The cooling system of claim 14 further comprising a control device in communication with the compressor, the control device comprising at least one sensor for detecting a condition of the chamber, the control device issuing a control instruction in response to a desired condition of the chamber, the compressor responsive to the control instruction to affect the chamber condition.

20. A method of fumigating and cooling perishable goods comprising the steps of:

placing said perishable goods on a surface;

providing an apparatus adapted to form a chamber over said perishable goods on the surface;

lowering the apparatus adapted to form a chamber over said perishable goods causing a seal material located on a lower perimeter of said chamber apparatus to deform against the surface to substantially seal the chamber;

introducing a fumigation gas within said chamber;

evacuating said fumigation gas from said chamber; raising the apparatus adapted to form a chamber;

positioning at least one cooling apparatus having a first portion and a second portion proximate the perishable goods, providing at least one carrier on which the cooling apparatus rests to facilitate movement of the apparatus;

lowering the apparatus adapted to form a chamber over said perishable goods and over the first portion of the cooling apparatus causing the seal material located on the lower perimeter of said chamber apparatus to deform against the surface to substantially seal the chamber; and cooling the perishable goods promptly after evacuating said fumigation gas from said chamber.

* * * * *